US010630173B2

(12) United States Patent
Zou et al.

(10) Patent No.: US 10,630,173 B2
(45) Date of Patent: Apr. 21, 2020

(54) NEGATIVE CHARGE PUMP AND AUDIO ASIC WITH SUCH NEGATIVE CHARGE PUMP

(71) Applicant: TDK Corporation, Tokyo (JP)

(72) Inventors: Lei Zou, København S (DK); Gino Rocca, Copenhagen (DK)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/072,047

(22) PCT Filed: Mar. 30, 2017

(86) PCT No.: PCT/EP2017/057550
§ 371 (c)(1),
(2) Date: Jul. 23, 2018

(87) PCT Pub. No.: WO2017/167880
PCT Pub. Date: Oct. 5, 2017

(65) Prior Publication Data
US 2019/0044438 A1  Feb. 7, 2019

(30) Foreign Application Priority Data
Apr. 1, 2016  (DE) .................. 10 2016 106 015

(51) Int. Cl.
*H02M 3/07*  (2006.01)
*H02M 1/15*  (2006.01)
*H02M 1/00*  (2006.01)

(52) U.S. Cl.
CPC .............. *H02M 3/07* (2013.01); *H02M 1/15* (2013.01); *H02M 2001/0025* (2013.01); *H02M 2003/071* (2013.01)

(58) Field of Classification Search
CPC ........... H02M 3/00; H02M 3/07; H02M 3/071
See application file for complete search history.

(56) References Cited

U.S. PATENT DOCUMENTS

| 5,627,458 A | 5/1997 | Nevin |
| 5,694,308 A | 12/1997 | Cave |
| 5,757,223 A * | 5/1998 | Nevin ..................... H02M 3/07 327/530 |
| 6,429,723 B1 | 8/2002 | Hastings |

(Continued)

FOREIGN PATENT DOCUMENTS

| CN | 101136586 A | 3/2008 |
| CN | 101990736 A | 3/2011 |

(Continued)

OTHER PUBLICATIONS

Abdelfattah, K. et al., "A 40nm Fully Integrated 82 Mw Stereo Headphone Modle for Mobile Applications," IEEE Journal of Solid-State Circuits, Aug. 2014, vol. 49, No. 8, pp. 1702-1714 (13 pages).

(Continued)

*Primary Examiner* — Hai L Nguyen
(74) *Attorney, Agent, or Firm* — Nixon Peabody LLP

(57) ABSTRACT

A negative charge pump without the need for a negative supply potential. The negative charge pump can be manufactured utilizing standard CMOS processes. The charge pump includes a first inverter, a second inverter, a charge storage and a coupling element.

16 Claims, 7 Drawing Sheets

(56) References Cited

U.S. PATENT DOCUMENTS

| | | | |
|---|---|---|---|
| 6,515,903 B1 | 2/2003 | Le | |
| 6,803,807 B2 * | 10/2004 | Fujiyama | H02M 3/07 327/536 |
| 7,145,318 B1 | 12/2006 | Chan | |
| 7,719,343 B2 | 5/2010 | Burgener et al. | |
| 8,830,776 B1 | 9/2014 | Choy | |
| 9,502,969 B2 * | 11/2016 | Arakawa | H02M 3/07 |
| 2002/0034082 A1 | 3/2002 | Yokomizo | |
| 2010/0244935 A1 | 9/2010 | Kim | |
| 2011/0089996 A1 | 4/2011 | Hunter | |
| 2011/0101938 A1 | 5/2011 | Ma et al. | |
| 2011/0181265 A1 | 7/2011 | Hirayama et al. | |
| 2013/0193910 A1 | 8/2013 | Kitamine | |
| 2013/0207717 A1 | 8/2013 | Matsuoka | |
| 2015/0016635 A1 | 1/2015 | Haas-Christensen | |
| 2015/0263610 A1 | 9/2015 | Ferrant | |

FOREIGN PATENT DOCUMENTS

| | | |
|---|---|---|
| JP | 2007505596 A | 3/2007 |
| JP | 2011152014 A | 8/2011 |
| JP | 2013158224 A | 8/2013 |
| JP | 2013192438 A | 9/2013 |

OTHER PUBLICATIONS

Chowdhury, I. et al., "An Integrated Reconfigurable Switched-Capacitor DC-DC Converter with a Dual-Loop Adaptive Gain-Pulse Control," Circuits and Systems, IEEE International Symposium, 2008, pp. 2610-2613 (4 pages).

Temes, G., et al., "Switched-Capacitor Power Supplies," École Polytechnique Fédérale de Lausanne (EPFL), Electronics Laboratories Advanced Engineering Course on Power Management, Part 1, Sep. 2-5, 2002, pp. 31-44 (10 pages).

International Search Report in International Patent Application No. PCT/EP2017/057550, dated Jun. 20, 2017 (4 pages).

Written Opinion in International Patent Application No. PCT/EP2017/057550, dated Jun. 20, 2017 (6 pages).

* cited by examiner

NEGATIVE CHARGE PUMP AND AUDIO ASIC WITH SUCH NEGATIVE CHARGE PUMP

CROSS-REFERENCE TO RELATED APPLICATIONS

This application is a U.S. National Stage of International Application No. PCT/EP2017/057550, filed Mar. 30, 2017, which claims the benefit of Germany Patent Application No. 102016106015.1, filed Apr. 1, 2016, both of which are incorporated herein by reference in their entireties.

FIELD OF THE INVENTION

Negative charge pump and audio ASIC with a negative charge pump.

The present invention refers to negative charge pumps, i.e. to charge pumps providing an electric potential below a reference potential and to audio ASIC (ASIC=Application-Specific Integrated Circuit) comprising such a negative charge pump.

BACKGROUND OF THE INVENTION

Charge pumps can be used in electrical circuits where a circuit element may continuously or temporarily need a supply voltage being larger than a usual voltage provided to supply the circuit. Especially as modern circuits become more power-efficient by reducing the supply voltage for the majority of the circuit elements, such charge pumps become more important. As an example, in the field of MEMS microphones with a MEMS capacity in a MEMS chip and with an electrical signal evaluation circuit in an ASIC chip, supply voltages of 1.2 V or below become popular. However, such a supply voltage for a signal amplifier is critical and may lead to distortion problems, especially when a large amplifier gain is required.

Negative charge pumps are known from U.S. Pat. No. 8,830,776.

Negative charge pumps have been used in many ASICs. However, many negative charge pumps need an electrical potential below a reference potential for their own power supply. Such a charge pump is known from U.S. Pat. No. 7,145,318.

Another charge pump is known from the article "A 40 nm fully integrated 82 MW stereo headphone module for mobile applications", IEEE Journal of Solid-State Circuits, Vol. 49, No. 8, 2014. However, this charge pump needs a large volume holding capacitor to store charge to maintain a negative output potential which makes a monolithic integration in an ASIC chip difficult.

Thus, what is needed is a negative charge pump that can replace previously used negative charge pumps in electrical circuits to avoid the need to redesign the known circuits.

SUMMARY OF THE INVENTION

Further, the charge pump should have a controllable output potential that may be controlled by a regulator to stabilize the output. Further, the charge pump should only need a positive supply voltage while providing a negative output voltage. Further, all circuit elements of the charge pump, including the elements of a regulator to stabilize the output, should be realizable with standard CMOS technology making the pump fully integratable without the need for special high-voltage transistors or external capacitors. Further, the pump should have a good performance and a low power consumption, especially when momentarily not in use. In particular, the quality of the output potential should be compatible with high-quality audio systems.

Further, the negative charge pump should be producible at low production costs.

Such a negative charge pump is defined in independent claim 1. The dependent claims define preferred embodiments.

The negative charge pump comprises a supply terminal, a GND (ground) terminal, an output terminal, and a first clock terminal. Further, the charge pump comprises a first inverter, a second inverter, and a first charge storage. The first inverter is connected between the supply terminal, the first clock terminal and the first charge storage. The second inverter is connected between the first charge storage, the GND terminal, and the output terminal. The second inverter is coupled to the first clock terminal. The first charge storage is connected between the first inverter and the second inverter. During operation and with respect to the electric potential of the GND potential, the electric potential of the supply terminal is positive. The electric potential of the output terminal is negative relative to the electric potential of the GND terminal.

Such a pump does not need a potential below the GND potential but produces an electric potential below the GND potential.

Thus, such a negative charge pump can be used in an electric circuit to be combined with the voltage between the GND potential and the positive electric potential of the supply terminal. This increased voltage can be used to drive an audio amplifier that is, thus, not limited to the usual supply voltage of the electrical circuit. Thus, distortions of an audio signal can be reduced and the amplitude of an audio signal provided at an output of the amplifier can be larger than the supply voltage of the electric circuit without the need of providing an additional electrical potential below the GND potential.

The inverters of the charge pump can be based on semiconductor switches and provide an output signal that is phase shifted by 180° relative to the respective phase of the clock signal. The first charge storage can be charged by the first inverter in a first half of a clock cycle and recharged by the respective other half of the clock cycle. As the charge pump is a negative charge pump providing a negative output potential, the charge pump may provide electrons at its output terminal. During the first half of the clock cycle, the first inverter electrically connects the first charge storage, which may be a capacitor, to the supply terminal, which provides a positive potential. Then, electrons may be removed from the electrode of the first charge storage connected to the supply terminal via the first inverter. At mainly the same time, the second inverter may connect the second electrode of the first charge storage to the GND terminal. Thus, the electrode of the first charge storage may be charged with electrons derived from the GND terminal. In the second half of the clock cycle, the second inverter may electrically connect the second electrode of the first charge storage to the output terminal. Thus, negative charge is provided at the output terminal. The first clock terminal may receive a first clock signal triggering the first inverter. The first clock terminal is coupled to the second inverter, e.g. with a first coupling element, to the second inverter. The coupling between the first clock terminal and the second inverter may be chosen such that the phase-shift between the first inverter and the second inverter is approximately 180°.

Thus, a clock signal for the second inverter is derived from the clock signal of the first clock terminal.

It is possible that a second charge storage is connected between the first clock terminal and the second converter to establish the coupling between the first clock terminal and the second inverter.

It is possible that the charge pump further comprises a second clock terminal, a third inverter, a fourth inverter, and a third charge storage. The third inverter is connected between the supply terminal, the second clock terminal and the third charge storage. The fourth inverter is connected between the third charge storage, the GND terminal, and the output terminal. The fourth inverter is coupled to the second clock terminal. The third charge storage is connected between the first inverter and the second inverter.

Thus, the first clock terminal may receive a first clock signal and the second clock terminal may receive a second clock signal. The clock signals supplied to the first clock terminal and to the second clock terminal may have the same frequency. Also, clock signals supplied to the second inverter and to the fourth inverter may have the same frequency. The phase-shift between the first clock signal and the second clock signal may be approximately 180°.

It is possible that the negative charge pump further comprises a fourth charge storage connected between the second clock terminal and the second inverter. The charge storages may be capacitors. The fourth charge storage may couple the second clock terminal to the fourth inverter.

The first charge storage and the second inverter may provide negative electric charge to the output terminal at mainly 180° of a clock cycle. The third charge storage and the fourth inverter may provide negative electric charge to the output terminal in the respective other half of the clock cycle. Thus, the output terminal is provided with negative electric charge during mainly 360° of the clock cycle. No holding capacitor having a large capacitance and a large volume is needed. Thus, no off-chip device is needed and all elements of the negative charge pump, including elements of a regulator, can be fully integrated.

It is possible that the negative charge pump further comprises a first coupling switch and a second coupling switch. Each coupling switch is connected between the GND terminal, the second inverter and the fourth inverter.

The two cross-coupling switches can be used to maximize the time in which one of the two charge storages selected from the first charge storage and the third charge storage is connected to the output terminal. Then, one of the two charge storages is connected to the output terminal at practically 2*180°=360°. The second inverter and the fourth inverter can comprise semiconductor-based switches and the two cross-coupling switches connect the control electrodes of the switches of the inverters to the ground potential at the respective period making a respective switch of the inverters between the respective charge storage and the output terminal conducting.

It is possible that the negative charge pump further comprises a regulation circuit. The regulation circuit is connected between the supply terminal, the first inverter, the GND terminal, and the output terminal. If the third inverter and the fourth inverter are present in the negative charge pump, then the regulation circuit is also connected between the third inverter and the fourth inverter. The regulation circuit does not need an electric potential below ground potential and stabilized the output potential.

It is possible that the regulation circuit has a voltage divider, an error amplifier, and a transistor. The voltage divider of the regulation circuit is connected between the supply terminal and the output terminal. The transistor of the regulation circuit is connected between the first inverter and the GND terminal. The error amplifier of the regulation circuit is connected between the supply terminal, the voltage divider, the GND terminal, and the transistor. The transistor of the regulation circuit is connected between the first inverter, the error amplifier, and the GND terminal.

It is possible that the error amplifier has a first input terminal, a second input terminal, and an output terminal. Further, the error amplifier may have a first transistor connected to the supply terminal and to a bias terminal. Further, the error amplifier may have a first input transistor connected to the first input terminal. Further, the error amplifier may have a second input transistor connected to the second input terminal and to the first input transistor. Further, the error amplifier may have a first grounded transistor connected to the first input transistor and to the GND terminal. Further, the error amplifier may have a second grounded transistor connected to the second input transistor, the first grounded transistor and to the GND terminal.

The first input transistor of the error amplifier may be connected to the voltage divider of the regulation circuit. The second input transistor of the error amplifier may be connected to the GND terminal.

The transistors of the charge pump and in particular the transistors of the error amplifier may be FETs (FET=Field Effect Transistor) having a source, a drain, and a gate. The first input transistor and the second input transistor and the first transistor connected to the supply terminal may be PMOS-FETs (PMOS=P-channel Metal-Oxide FETs). The first grounded transistor and the second grounded transistor may be NMOS-FETs (NMOS=N-channel Metal-Oxide FETs).

In particular, the source of the first transistor of the amplifier may be connected to the supply terminal. The gate of the first transistor of the error amplifier may be connected to the bias terminal. The drain of the first transistor of the error amplifier may be connected to the source connections of the first input transistor and of the second input transistor. The drains of the first and of the second input transistors may be connected to the drains of the first and second grounded transistors, respectively. The source connections of the first and of the second grounded transistors may be connected to the GND terminal. The gate of the first input transistor may be connected to the voltage divider. The gate of the second input transistor may be connected to the ground terminal. The two gate connections of the two grounded transistors may be connected to each other and to the drain of the first input transistor.

It is possible that the error amplifier further comprises six additional transistors. Three of the additional transistors and the first grounded transistor are cascaded in a first cascade and the other three of the additional transistors and the second grounded transistor are cascaded in a second cascade.

It is possible that the voltage divider comprises two resistive elements electrically connected in series between the supply terminal and the output terminal.

It is possible that the negative charge pump further comprises a clock generator connected to the first clock terminal.

The clock generator can comprise a ring oscillator.

The ring oscillator can comprise an odd number of inverters electrically connected in series and having a feedback line between the 2*i+1 (i: natural number) inverters and the input of the first inverter. Further, the oscillator can have an additional converter electrically connected to the output of the ring oscillator. Then, the clock generator provides two output signals with the output of the additional inverter having a phase difference of 180° relative to the output signal of the ordinary output of the clock generator. These two output signals can be used as the first clock signal provided to the first clock terminal and the respective second clock signal provided to the second clock terminal.

The charge storages can be capacitors which can be integrated in ASIC chips and manufactured utilizing standard CMOS processes.

The capacitances of the first and of the third charge storages can be in the range from 10 pF to 100 pF. The capacities of the second and of the fourth charge storages can be in the range from 1 pF to 10 pF.

It is possible that each inverter comprises two transistors, a clock signal input and a signal output. The two transistors can be MOS-FETs. The first of the two transistors can be a PMOS-FET. The respective second transistor can be an NMOS-FET. The drains of the two transistors are connected. The gates of the two transistors can be connected to the clock signal input of the respective inverter. The drains of the first and of the third inverter may establish the signal output of the respective inverter. One source of the second and of the fourth inverter may be connected to the GND terminal. The respective other source may be connected to the output terminal of the negative charge pump.

It is possible that every circuit element is directly embedded in a CMOS chip.

It is possible that the negative charge pump is part of an audio ASIC. The audio ASIC comprises the charge pump and an audio amplifier. The supply voltage of the amplifier is the sum of the absolute values of the supply voltage of the negative charge pump and the voltage provided by the negative charge pump.

Thus, the amplifier's gain can be increased without adding distortion.

Regulation of the charge pump's output voltage can be easily obtained to a value determined by the ratio of the two resistance values of the resistance elements of the voltage divider. If the resistance element connected to the supply terminal has a resistance R1 and if the resistance of the resistance element connected to the output terminal has a resistance R2, then the voltage provided between the GND terminal and the output terminal is:

$VNEG=-R2/R1*VDD$ (where $VDD$ is the supply voltage)

The frequency of the clock signals can be over 1 MHz. An according clock generator can be easily made and integrated in the according chip having the respective other circuit elements. The size of the four capacitors are feasible to be integrated in the ASIC, too.

The transistor connected to the error amplifier, e.g. between the supply voltage, the error amplifier and the output terminal, can be a NMOS transistor with the source connected to ground, the gate connected to the error amplifier and the drain connected to the supply terminal. Then, a negative feedback circuit of the regulation circuit is obtained that forces the two inputs of the error amplifier to have the same potential, i.e. GND potential.

BRIEF DESCRIPTION OF THE DRAWINGS

The general concept of the negative charge pump, preferred details of segments of the circuits and preferred embodiments are shown in the schematic accompanying figures.

DETAILED DESCRIPTION

Figure 1:
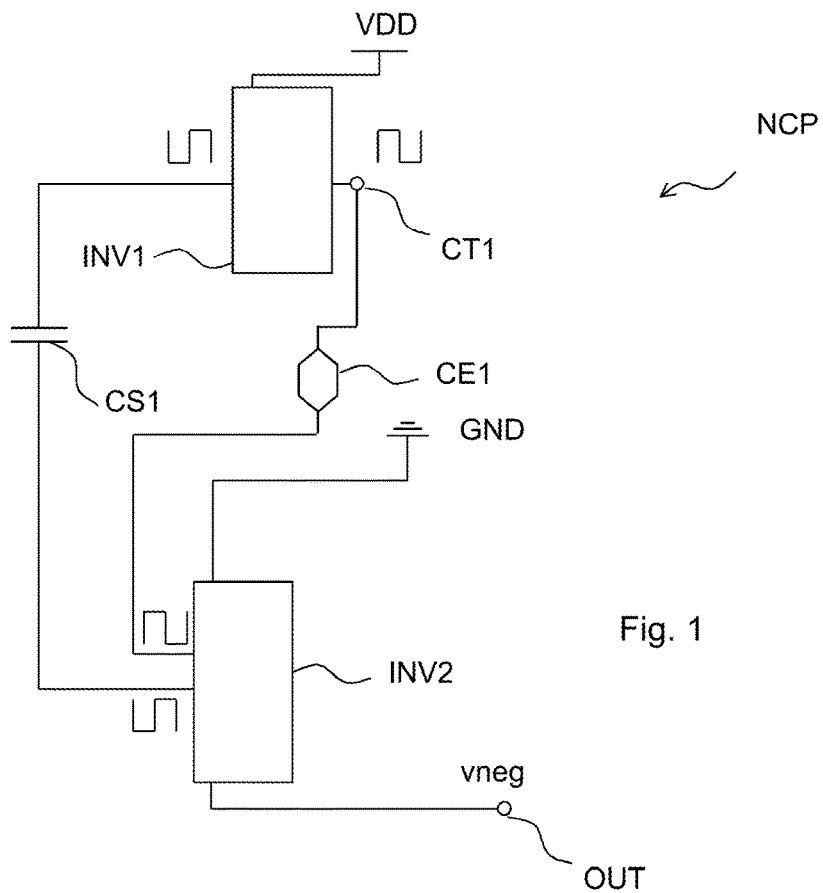
FIG. 1 shows an equivalent circuit diagram of integral segments of the charge pump.

FIG. 1 shows circuit elements illustrating the basic principle of the negative charge pump NCP. The charge pump NCP has a supply terminal and a GND terminal. During operation, the supply terminal is provided with a positive supply voltage VDD with respect to ground. At its output port, the charge pump provides the negative voltage VNEG with respect to ground. The negative charge pump has a first inverter INV1 and a second inverter INV2. Further, the charge pump NCP has a first clock terminal CT1 and a first charge storage CS1. The first inverter INV1 is electrically connected between the supply terminal VDD, the first clock terminal CT1 and the first charge storage CS1. The second inverter is electrically connected between the GND terminal, the first charge storage CS1, and the output port providing VNEG. Further, the first clock terminal CT1 and the second inverter INV2 are coupled. The coupling can be realized by a first coupling element CE1. The first clock terminal CT1 is provided for receiving a first clock signal. The clock signal can be a square wave with a voltage switching between 0 and the supply voltage VDD. The first inverter INV1 has an output terminal at which the first clock signal is inverted. The inverted signal can have a voltage switching between a positive voltage VPOS being smaller than the supply voltage VDD and the supply voltage VDD. The second inverter INV2 is provided to receive a clock signal which is derived from the first clock signal. This derived clock signal switches between –VDD and 0. The inverted signal of the signal received by the second inverter INV2 switches between VNEG and 0. This inverted signal of the second inverter INV2 is the base for the negative voltage VNEG provided by the negative charge pump NCP. During a first half-cycle of the first clock signal, negative charge is removed from the first charge storage CS1 to the supply rail connected to the supply terminal. During the respective other half and while the second inverter INV2 electrically connects the first charge storage CS1 to the output port, negative electric charge is moved from the charge storage to the output port. The frequency of the clock signal received by the second inverter INV2 equals the frequency of the first clock signal. The phase difference between the first clock signal at the first clock terminal CT1 and the clock signal received by the second inverter INV2 is chosen such that negative electric charge is iteratively carried from the GND terminal via the respective electrode of the first charge storage CS1 to the output terminal OUT.

Figure 2:
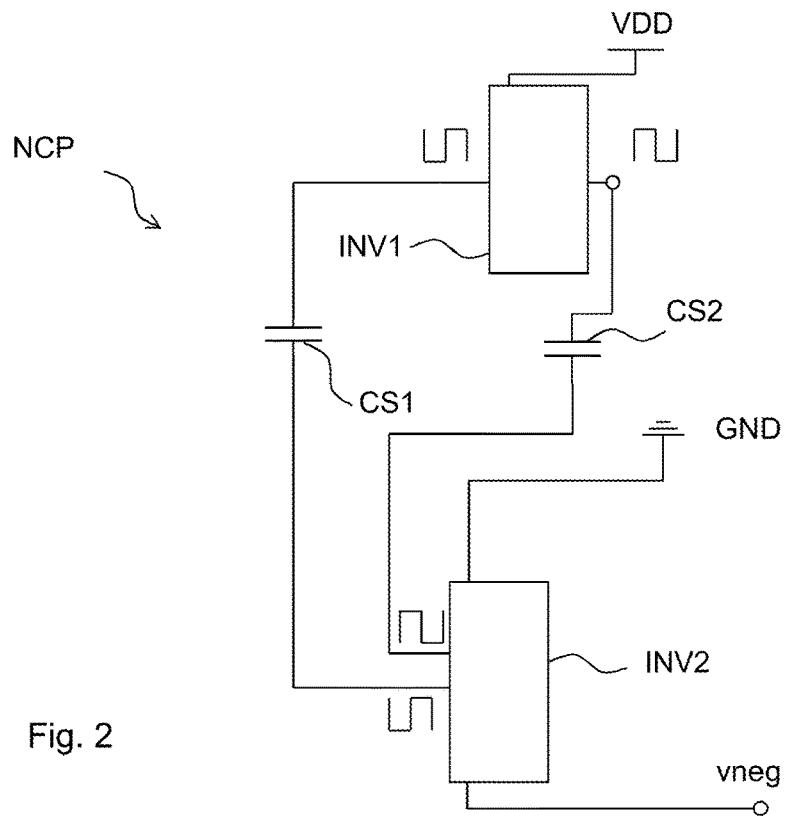
FIG. 2 shows the option of coupling the inverters 1 and 2 via a charge storage.

FIG. 2 shows an equivalent circuit diagram of basic circuit elements of the negative charge pump NCP where the first coupling element CE1 is a charge storage CS2. By iteratively charging and decharging this second charge storage CS2, the clock signal for the second inverter INV2 having a voltage between −VDD and 0 is obtained. The capacity of the second charge storage CS2 is chosen such that the phase difference between the first clock signal and the clock signal provided to the second inverter INV2 is optimal, preferably shifted by 180° with respect to the first clock signal.

Figure 3:
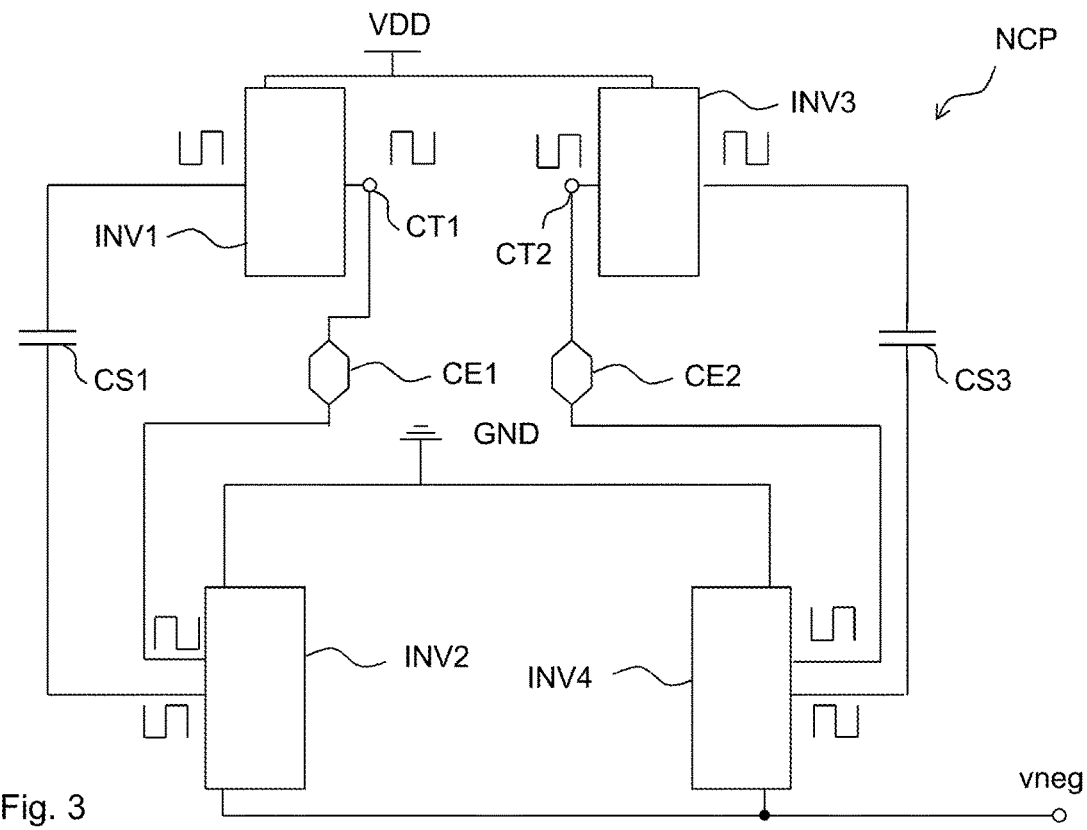
FIG. 3 shows the use of four inverters.

FIG. 3 shows possible additional circuit elements of the negative charge pump NCP. The pump has a third inverter INV3 and a fourth inverter INV4. The third inverter INV3 is electrically connected between the input terminal VDD, a third charge storage CS3 and a second coupling element CE2. The fourth inverter is electrically connected between the GND terminal, the second coupling element CE2, the third charge storage CS3 and the output terminal. The second coupling element CE2 establishes the coupling between the third inverter INV3 and the fourth inverter INV4. The third inverter INV3 has an input port CT2 to receive a second clock signal. Via the second coupling element CE2, the second clock signal is phase-shifted and provided as a clock signal to the fourth inverter INV4. The fourth inverter INV4 periodically electrically connects the third charge storage CS3 to the output port. It is preferred that the second inverter INV2 and the fourth inverter INV4 iteratively connect the output port to the first charge storage CS1 and to the third charge storage CS3, respectively. Preferably, the output port is only connected to one of the two charge storages only at any time. Therefore, it is preferred that the first inverter INV1, the first charge storage CS1, the first coupling element CE1, and the second inverter INV2 establish a first segment of the negative charge pump NCP while the third inverter INV3, the second coupling element CE2, the third charge storage CS3 and the fourth inverter INV4 establish a second segment of the negative charge pump NCP. Both segments are based on the same working principle. The first and the second clock signals have the same frequency and a phase shift of preferably 180°. Thus, preferably, at any point in time during operation, the output terminal is provided with negative electric charge by either the first charge storage CS1 or by the third charge storage CS3.

Figure 4:
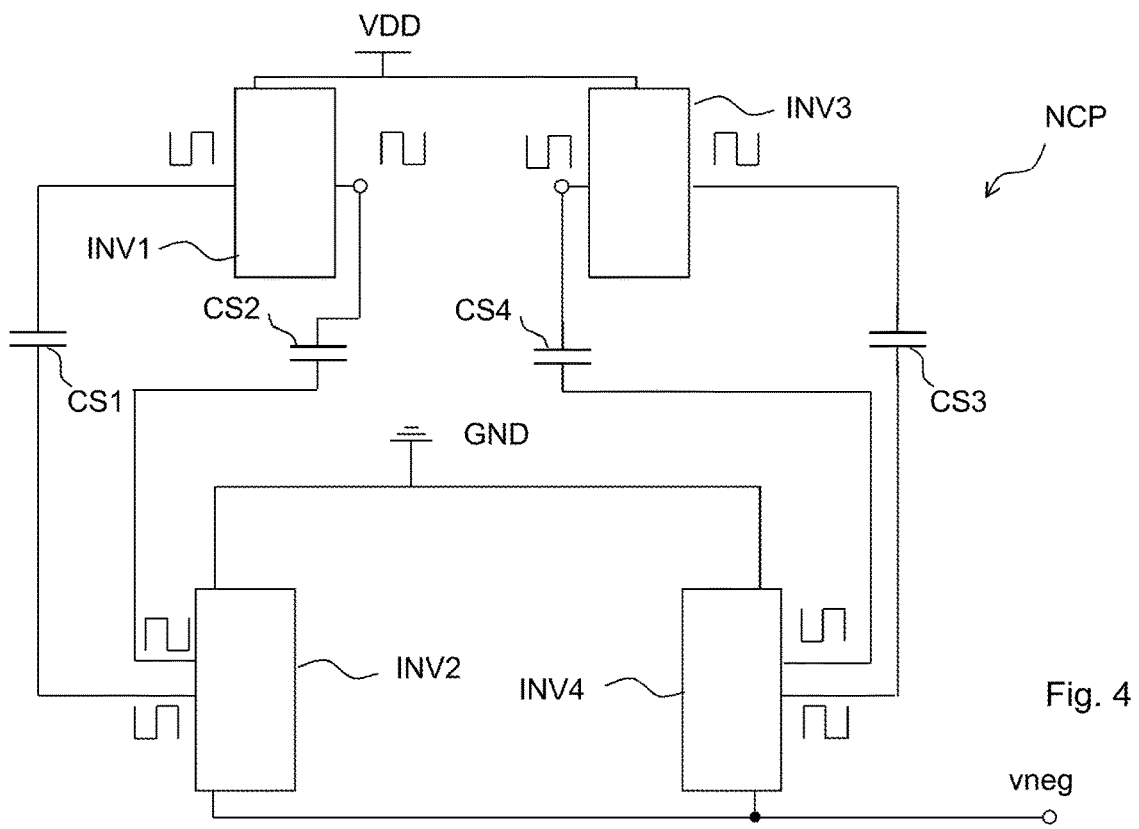
FIG. 4 shows the use of four inverters and four charge storages.

FIG. 4 shows the use of charge storages CS2, CS4 for the first and second coupling elements CE1, CE2.

The first, second, third, and fourth charge storage can be realized as a capacitor with one electrode connected to the first or third inverter and the other electrode connected to the second and fourth inverter, respectively.

Figure 5:
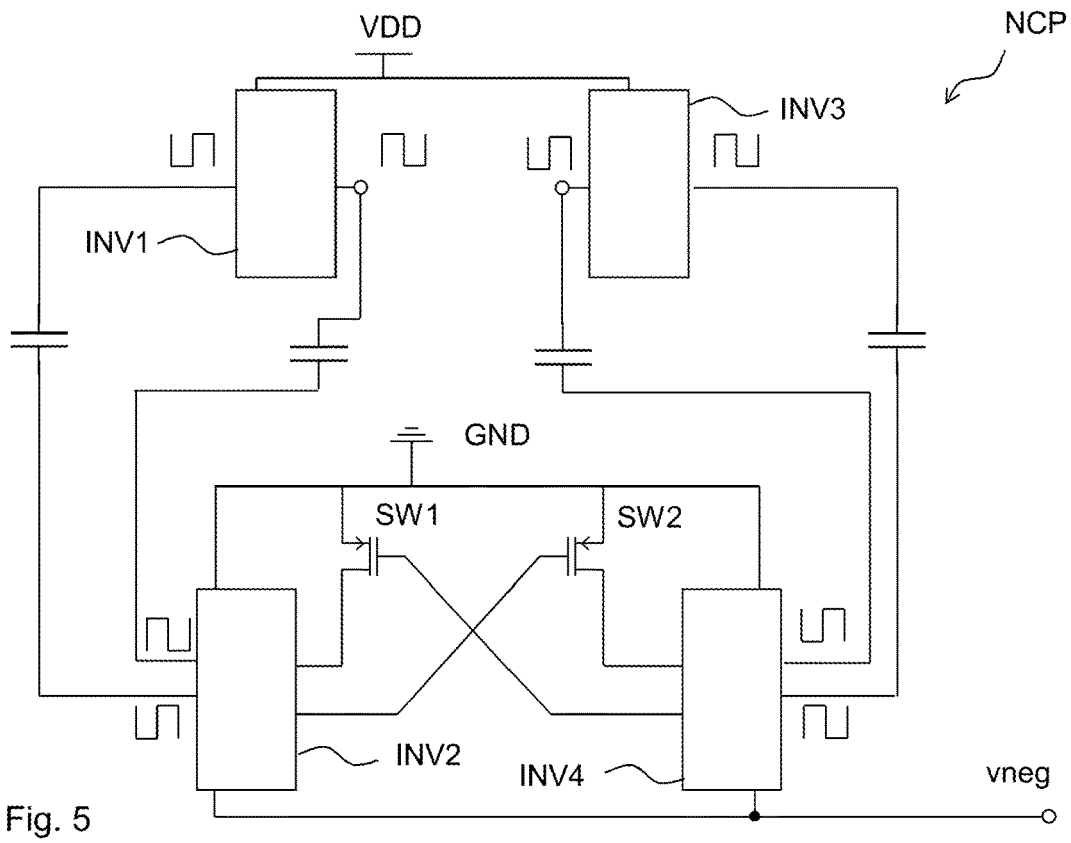
FIG. 5 shows a possible arrangement of cross-coupling switches.

FIG. 5 shows the use of cross-coupling switches SW1, SW2 to maximize the time in which the output port is connected to one of the two charge storages selected from the first charge storage and the third charge storage. The two cross-coupling switches are realized as field effect transistors. The source of each transistor is connected to the GND terminal. The drain of the left switch SW1 is connected to the second inverter INV2 and the drain of the second switch SW2 is connected to the fourth inverter. The gate of the first switch SW1 is connected to the fourth inverter INV4 and the gate of the second switch SW2 is connected to the second inverter INV2 establishing the cross-connection. With the help of these two cross-coupling transistors, the level shifting of the clock signals received by the second inverter INV2 and the fourth inverter INV4, respectively, and via the two coupling elements is improved. Thus, in one half clock cycle, the second inverter INV2 electrically connects the first charge storage to the output terminal. In the respective other half of the clock cycle, the fourth inverter INV4 electrically connects the third charge storage to the output terminal.

Figure 6:
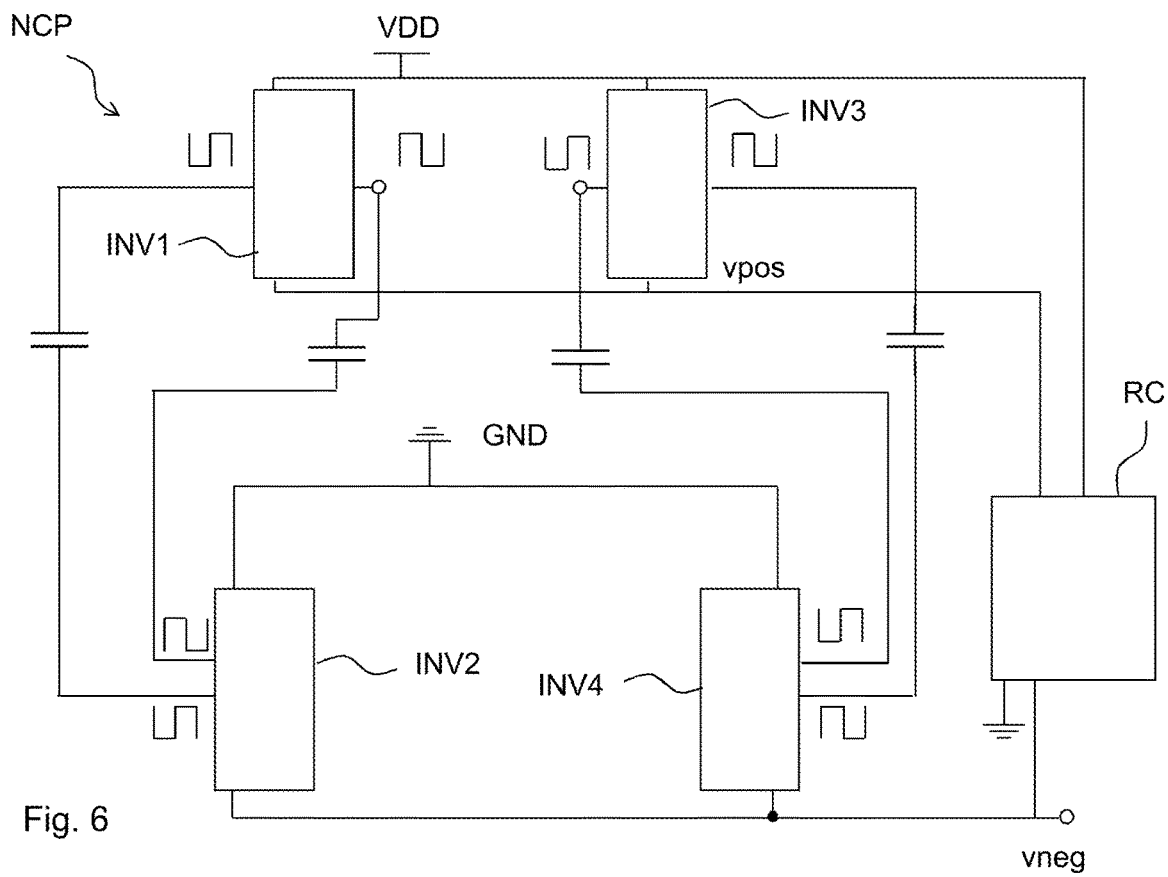
FIG. 6 shows the arrangement of the regulation circuit relative to the other circuit elements.

Often, regulated output voltages are needed from negative charge pumps. FIG. 6 shows basic circuit elements of an equivalent circuit diagram of the negative charge pump NCP having a regulation circuit RC. The regulation circuit RC is connected to the supply terminal VDD, to the first and third inverter INV1, INV3, to the GND terminal and to the output terminal. At the terminal of the first inverter and of the third inverter INV1, INV3 towards the regulation circuit RC, the two inverters provide a positive voltage VPOS between 0 and the supply voltage VDD.

The regulation circuit RC is suited to control the output voltage VNEG provided at the output port.

Figure 7:
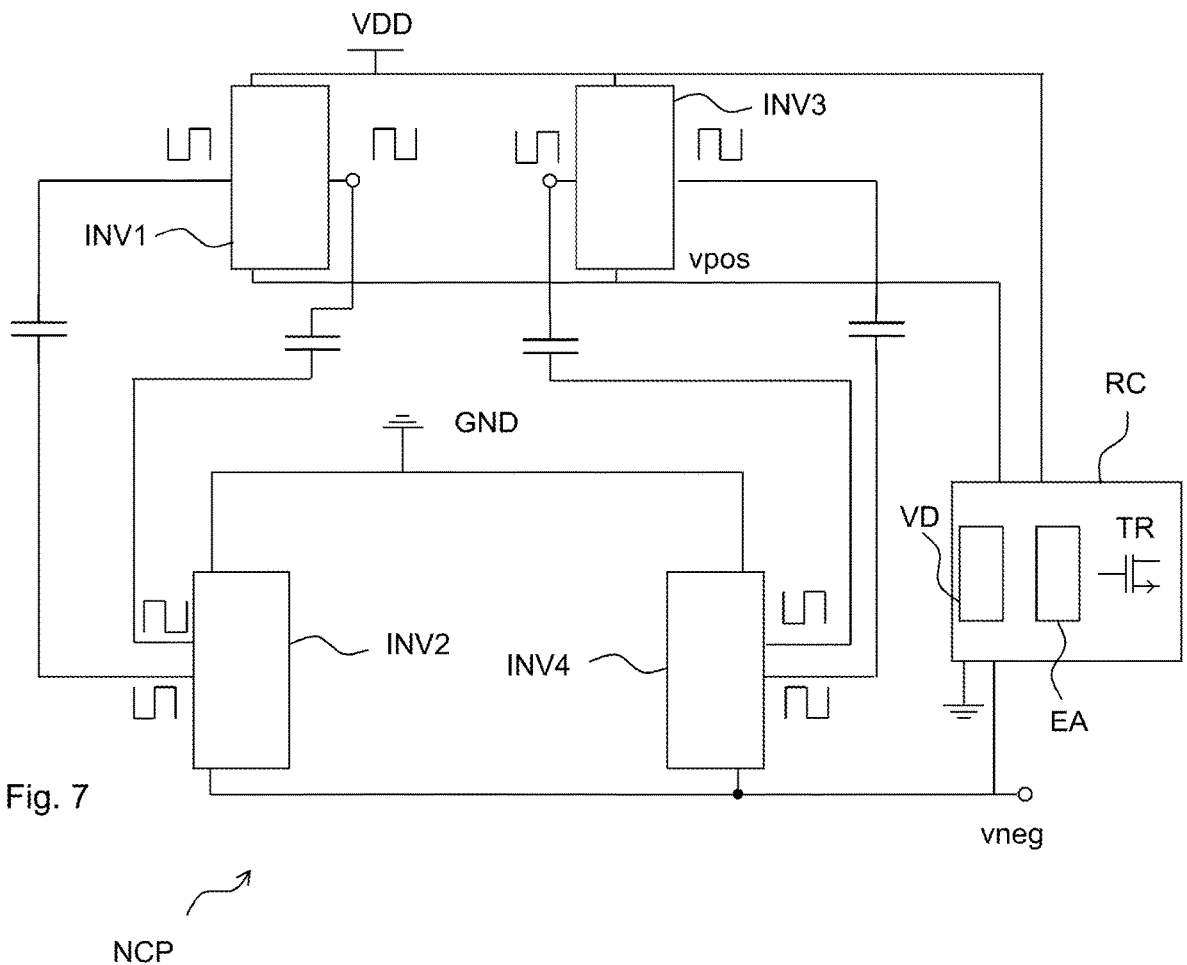
FIG. 7 shows further details of the regulation circuit.

FIG. 7 shows further details of the regulation circuit RC. The regulation circuit comprises a voltage divider VD, an error amplifier EA, and a transistor TR which may be an NMOS-FET. Via the voltage divider VT, the voltage VNEG is stabilized at a preferred value. Therefore, the error amplifier EA monitors the correct actual voltage. If the need to correct the voltage provided at the output port is realized, then the voltage settings in the negative charge pump are readjusted utilizing transistor TR.

Figure 8:
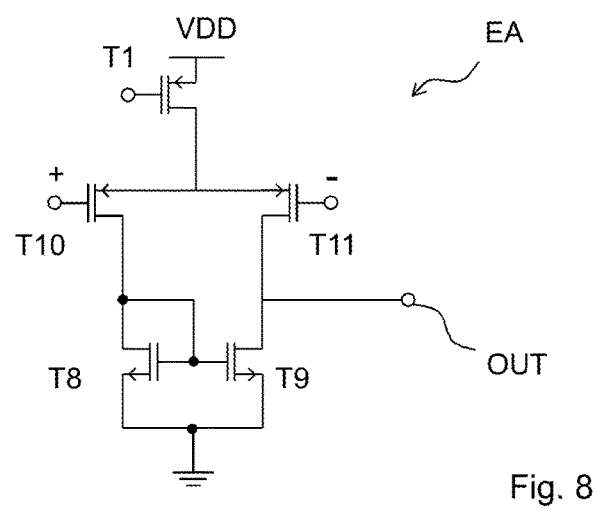
FIG. 8 shows a possible implementation of the error amplifier.

FIG. 8 shows a possible implementation of the error amplifier EA. The error amplifier EA has a connection to the supply terminal VDD and to the GND terminal. Further, the error amplifier has a first input terminal (+) and a second input terminal (−). Further, the error amplifier EA has an output terminal OUT. The error amplifier EA shown in FIG. 8 has five transistors which can be MOS-FETs. A first transistor T1 has its gate connected to a bias terminal. Its source is connected to the supply terminal VDD. Its drain is connected to the source connections of a first input transistor T10 and of a second input transistor T11. The gate of the first input transistor T10 is connected to the first input terminal of the error amplifier. The gate of the second input transistor T11 is connected to the second input terminal of the error amplifier. The error amplifier EA has a first grounded transistor T8 and a second grounded transistor T9. The drain of the first grounded transistor T8 is connected to the drain of the first input transistor T10. The drain of the second grounded transistor T9 is connected to the drain of the second input transistor T11. The source connections of the first and of the second grounded transistors T8, T9 are connected to the GND terminal. The drain connections of the first input transistor T10 and of the first grounded transistor T8 are connected to the gate connections of the first and of the second grounded transistors. The drain connections of the second input transistor T11 and of the second grounded transistor T9 are connected to the output terminal OUT of the error amplifier EA.

The first input terminal (+) of the error amplifier EA can be connected to the voltage divider VD of the regulation circuit RC. The second input port (−) can be connected to the GND terminal. The error amplifier EA establishes an operation amplifier for monitoring voltage differences between the first and the second input terminal.

Transistors T1, T10, T11 can be PMOS-FETs. Transistors T8, T9 can be NMOS-FETs.

Figure 9:
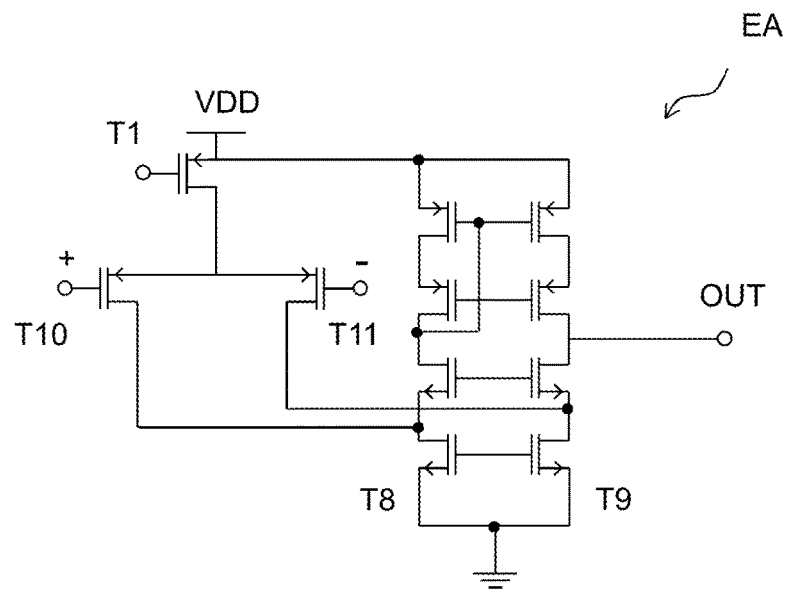
FIG. 9 shows a possible extension of the error amplifier.

FIG. 9 shows another possible embodiment of the error amplifier EA having further transistors. Three further transistors and the first grounded transistor T8 establish a first cascade. Three further transistors and the second grounded transistor establish a second cascade. One of the transistors of the second cascade is added between the second grounded transistor T9 and the output port OUT.

Four of the six additional transistors can be PMOS-FETs. Two transistors can be NMOS-FETs.

The source connections of the first transistors of the two cascades are connected to the supply terminal. Their drain connections are connected to the source connections of the respective next transistors in the respective cascade. Their drain connections are connected to the drain connections of the respective third transistors in the respective cascade. Their source connections are connected to the source connections of the respective ground transistors T8, T9. The gate connections of the first two transistors of the cascades are electrically connected to the drain connection of the second transistor of the cascade that is not connected to the output port.

Figure 10:
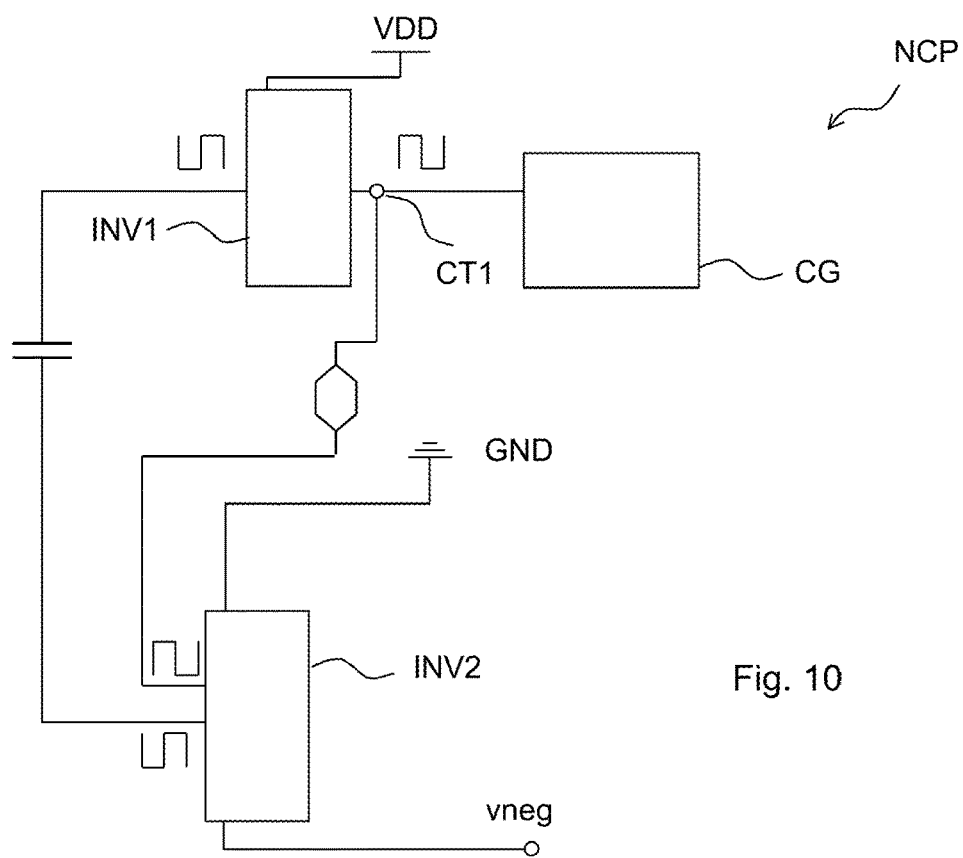
FIG. 10 shows the arrangement of the clock generator relative to other circuit elements.

FIG. 10 shows the arrangement of a clock generator CEG relative to other circuit elements. The clock generator CEG provides a clock signal and is connected to the first clock terminal CT1. The clock signal can have a frequency of 1 MHz or higher. The clock generator CEG can also provide a second clock signal having a phase shift of 180° relative to the first clock signal. The second clock signal can be provided to the second clock terminal if present.

Figure 11:
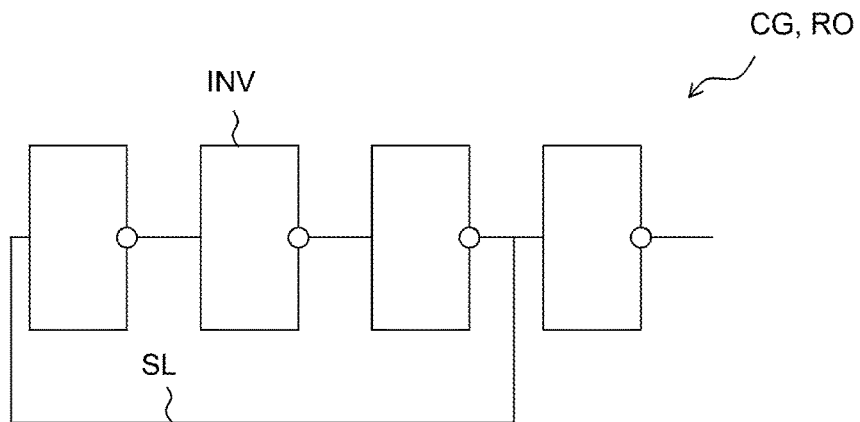
FIG. 11 shows a possible implementation of the clock generator.

FIG. 11 shows a possible realization of the clock generator CG. The clock generator can comprise a ring oscillator RO comprising an odd number of three or more inverters INV electrically connected in series. A feedback can be obtained by a signal line connecting the output of the respective inverter with the input of the first inverter. The clock generator shown in FIG. 11 has an additional, fourth inverter connected to the output of the ring oscillator which inverts the output of the ring oscillator and provides a second clock signal with a phase difference of 180° relative to the clock signal created via the feedback loop utilizing the signal line SL.

Figure 12:
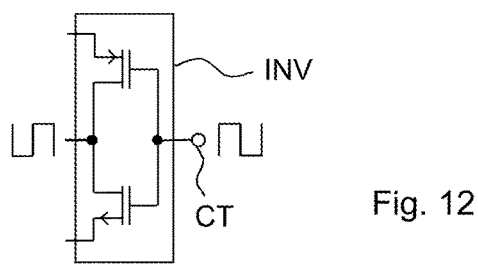
FIG. 12 shows a possible implementation of an inverter.

FIG. 12 shows a possible realization of an inverter INV. An inverter INV of a negative charge pump can comprise two MOS-FETs, in particular a PMOS-FET and a NMOS-FET. The drain of the PMOS-FET is connected to the drain of the NMOS-FET. The gate connections of the two transistors are connected and can receive a clock signal at the clock terminal CT. At their drain connection, an inverted signal of the signal received at the clock terminal CT is provided. In particular, when the clock signal received at the clock terminal CT is at a high potential, then the lower transistor, the NMOS-FET, is conducting between its drain and its source connection. If the received clock signal is at its low potential state, then the upper transistor, the PMOS-FET, is activated and the transistor is conducting between the source and the drain. Thus, when the inverter INV is used as the first inverter INV1 as shown in the circuit in FIG. 10, then the first charge storage is electrically connected to the supply terminal VDD when the first clock signal is in its second half of the clock cycle.

Figure 13:
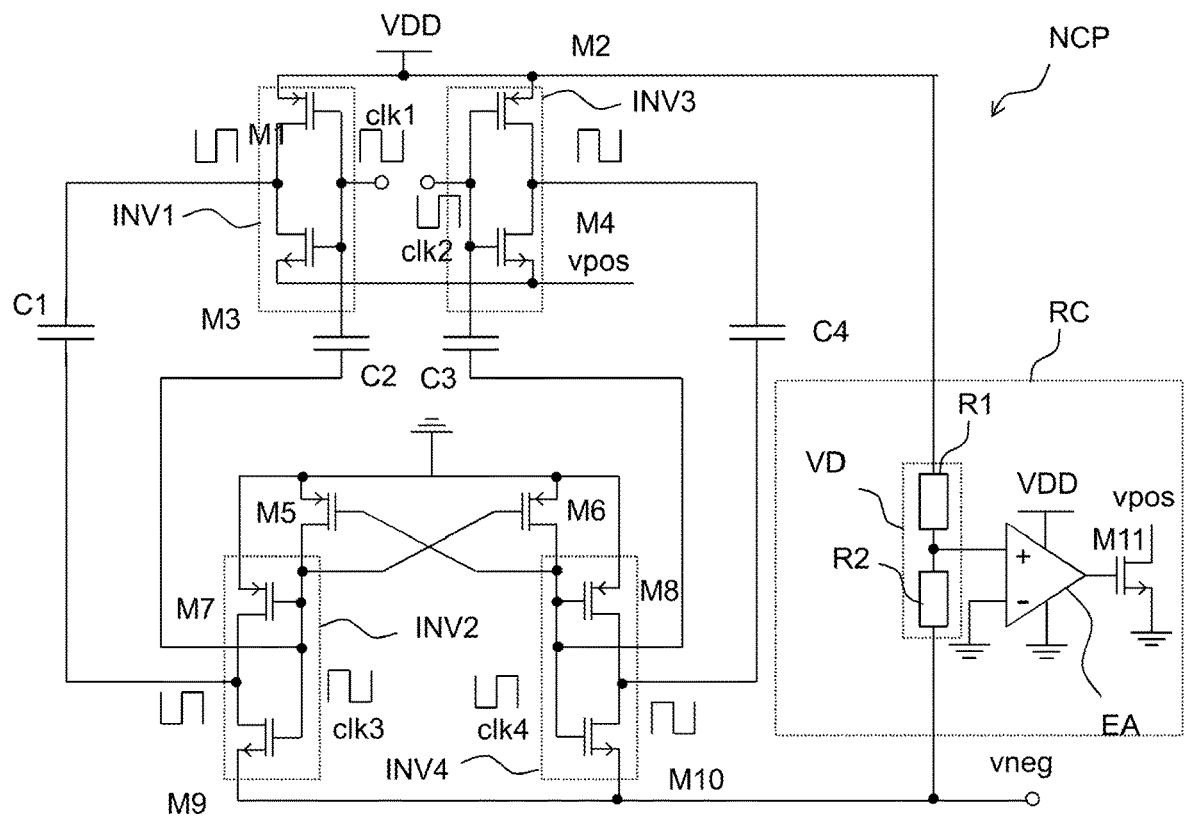
FIG. 13 shows the equivalent circuit diagram of a preferred embodiment of the negative charge pump.

FIG. 13 shows one possible realization of the negative charge pump NCP including possible realizations of the inverters, the voltage divider VD and the transistor of the regulation circuit RC.

The charge pump NCP has two input clock signals as clk1 and clk2. The signals clk1 and clk2 are non-overlapping and opposite phase relative to each other. The other two clock clk3 and clk4 are level shifted from clk1 and clk2, respectively. There are two main flying capacitors C1 and C4, which are responsible to store and transfer energy to generate Vneg. There are also two rather small flying capacitors C3, and C4, which are used to generate clk3 and clk4. There are four inverters INV1-4 built by transistors PMOS M1 and NMOS M3, PMOS M2 and NMOS M4, PMOS M7 and NMOS M9, PMOS M8 and NMOS M10. Also, there are two cross-coupled PMOS transistors M5 and M6.

The four invertors INV1-4 in the pump can switch on/off completely. The on resistance of each switch is minimized which leads to a high energy efficiency of the pump. The on resistance of each switch transistor in the pump is a part of the efficiency degradation source.

For the first inverter INV1, the source of M1 is connected to VDD, and drain is connected to the drain of M3, and connected to C1, the source of M3 is connected to Vpos. The input of the first inverter is clk1 which is a clock voltage pulse from VDD to GND. The output of the first inverter INV1 is an inverted pulse of clk1 but from Vpos to VDD.

For the third inverter INV3, the source of M2 is connected to VDD, and drain is connected to the drain of M4, and connected to C4, the source of M4 is connected to Vpos. The input of the third inverter INV3 is clk2 which is a clock voltage pulse from GND to VDD. The output of the third inverter INV3 is an inverted pulse of clk2 but from VDD to Vpos.

For the second inverter INV2, the source of M7 is connected to GND, and drain is connected to the drain of M9, and connected to C1, the source of M9 is connected to Vneg. The input of the second inverter INV2 is clk3 which is a clock voltage pulse from GND to −VDD. The output of the second inverter INV2 is an inverted voltage pulse of clk3 but from Vneg to GND.

For the fourth inverter INV4, the source of M8 is connected to GND, and drain is connected to the drain of M10, and connected to C4, the source of M10 is connected to Vneg. The input of the fourth inverter INV4 is clk4 which is a clock voltage pulse from −VDD to GND. The output of the inverter is an inverted voltage pulse of clk4 but from GND to Vneg.

PMOS M5 source is connected to GND and drain is connected to clk3 and the gate of M6.

PMOS M6 source is connected to GND and drain is connected to clk4 and the gate of M5.

Due to the cross-coupled placement of M5 and M6, the node of clk3 cannot be equal to clk4, either clk3 or clk4 is grounded at half of the clock cycle. The charge of C2 by VDD leads to the level shift of clk1 to clk3 with one VDD drop, and then clk3 is a voltage pulse from GND to −VDD. The charge of C3 by VDD leads to the level shift of clk2 to clk4 with one VDD drop, and then clk4 is a voltage pulse from −VDD to GND.

When clk4 equals −VDD, clk4 can fully turn on M8 and fully turn off M10. At this period, C4 is charged by VDD. In the following half clock period where clk4 equals GND, clk4 can fully turn on M10 and fully turn off M8. Now, C4 is discharged to generate Vneg.

When clk3 equals GND, clk3 can fully turn on M9 and fully turn off M7. At this period, C1 is discharged to generate Vneg. In the following half clock period where clk3 equals −VDD, clk3 can fully turn on M7 and fully turn off M9. Now, C1 is charged by VDD.

As a result, Vneg is generated for the whole clock cycle so that there is no need to add a large holding capacitor to sustain Vneg for either half clock cycle while a holding capacitor is a must in standard switched-capacitor based negative charge pumps. The load current driving capability at Vneg depends on the capacitance of two main flying capacitors C1 and C4, and the clock frequency of clk1 and clk2. Considering a fast clock over 1 MHz which can be easily made available in an ASIC, the size of C1 and C4 are feasible to be integrated on the ASIC.

The regulator part includes resistors R1 and R2, where R1 R2, an error amplifier EA and a NMOS transistor M11. The source of M11 is connected to GND and the drain is connected to Vpos. The amplifier output is coupled to M11 gate.

The negative feedback forces the two inputs of the error amplifier EA to be at the same potential, and regulates the two node voltages of Vneg and Vpos according to the following equations:

$$Vneg = -(R2/R1)*VDD$$

$$Vpos = Vneg + VDD$$

This negative charge pump uses a one-stage pump so that Vneg+VDD cannot be a negative voltage. This means that Vpos is positive. NMOS M11 drain is at a positive voltage and its source is connected to GND, while the gate control voltage of M11 is also positive. So, the error amplifier EA can be supplied with normal supply rails as VDD and GND output the proper gate control voltage to M11. When the feedback is operated, nodes Vpos and Vneg are regulated. Vneg can be set by the ratio R1/R2.

Figure 14:
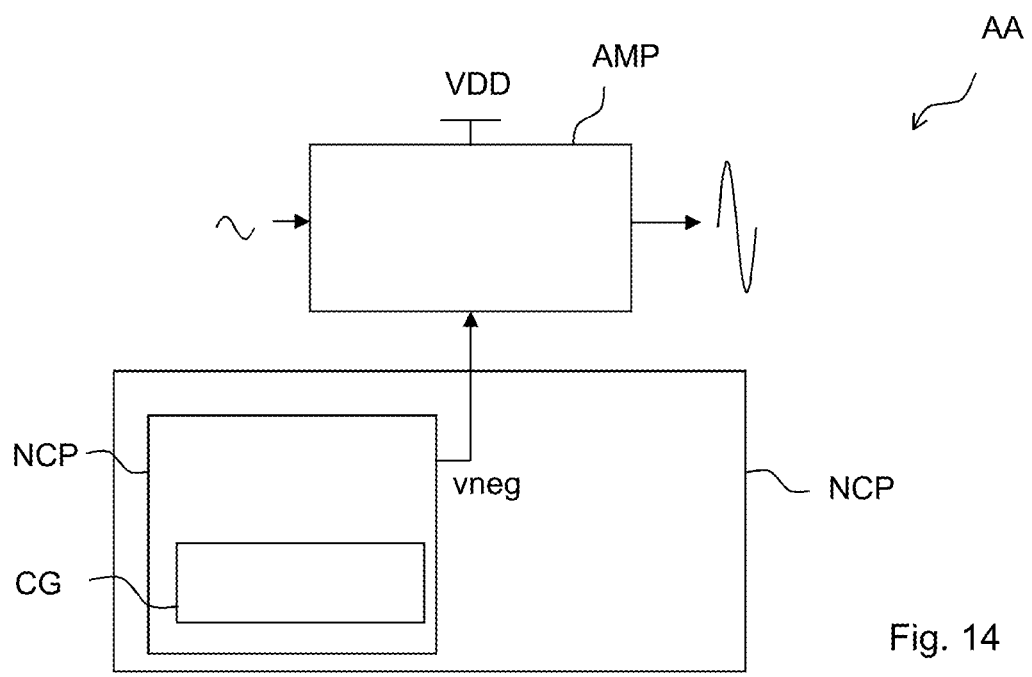
FIG. 14 shows schematics of an equivalent circuit diagram of an audio ASIC including the negative charge pump.

FIG. 14 shows a possible use of the negative charge pump NCP in an audio ASIC AA. The clock generator CG produces a first and/or a second clock signal triggering the inverters of the charge pump NCP. The charge pump provides an active output voltage VNEG which is available over practically 360° of the clock cycle without the need for large and bulky capacitors. Further, the available supply voltage can be increased by the negative voltage VNEG to increase the output swing of an audio signal amplifier AMP. Thus, distortions at a high amplifier gain are reduced, and no additional negative electrical potential needs to be provided for a proper functioning of a negative charge pump NCP.

The invention claimed is:

1. A negative charge pump, comprising
a supply terminal, a ground terminal, an output terminal, a first clock terminal, and a second clock terminal;
a first inverter, a second inverter, a third inverter, a fourth inverter, a first charge storage, and a third charge storage;
where
the first inverter is connected between the supply terminal, the first clock terminal, and the first charge storage;
the second inverter is connected between the first charge storage, the ground terminal, and the output terminal; and coupled to the first clock terminal;
the first charge storage is connected between the first inverter and the second inverter;
during operation and with respect to the electric potential of the ground terminal the electric potential of the supply terminal is positive while the electric potential of the output terminal is negative;
the third inverter is connected between the supply terminal, the second clock terminal, and the third charge storage;
the fourth inverter is connected between the third charge storage, the ground terminal, and the output terminal; and coupled to the second clock terminal;
the third charge storage is connected between the first inverter and the second inverter.

2. The negative charge pump of claim 1, further comprising a second charge storage connected between the first clock terminal and the second inverter.

3. The negative charge pump of claim 1, further comprising a fourth charge storage connected between the second clock terminal and the second inverter.

4. The negative charge pump of claim 1, further comprising a first and a second cross coupling switch, each being connected between the ground terminal, the second inverter and the fourth inverter.

5. The negative charge pump of claim 1, further comprising a regulation circuit connected between the supply terminal, the first inverter, the ground terminal, and the output terminal.

6. The negative charge pump of claim 5, where
the regulation circuit has a voltage divider, an error amplifier, and a transistor;
the voltage divider is connected between the supply terminal and the output terminal;
the transistor is connected between the first inverter and the ground terminal;
the error amplifier is connected between the supply terminal, the voltage divider, the ground terminal, and the transistor;
the transistor is connected between the first inverter, the error amplifier, and the ground terminal.

7. The negative charge pump of claim 6, where the error amplifier has
a first input terminal, a second input terminal, and an output terminal,
a first transistor connected to the supply terminal and to a bias terminal,
a first input transistor connected to the first input terminal,
a second input transistor connected to the second input terminal and to the first input transistor,
a first grounded transistor connected to the first input transistor and the ground terminal,
a second grounded transistor connected to the second input transistor, the first grounded transistor, and the ground terminal.

8. The negative charge pump of claim 7, the error amplifier further comprising six additional transistors, where
three of the additional transistors and the first grounded transistor are cascaded in a first cascade and
the other three of the additional transistors and the second grounded transistor are cascaded in a second cascade.

9. The negative charge pump of claim 7, the error amplifier further comprising interconnections between the bias port and the gates of the first transistors of the cascades.

10. The negative charge pump of claim 1, further comprising a clock generator connected to the first clock terminal.

11. The negative charge pump of claim 10, where the clock generator comprises a ring oscillator.

12. The negative charge pump of one of claim 1, where
the charge storages are capacitors,
each inverter comprises two transistors, a clock signal input and a signal output.

13. The negative charge pump of claim 1, where each inverter comprises an PMOS field effect transistor (FET) and an NMOS FET.

14. The negative charge pump of claim 1, where every circuit element is directly embedded in a CMOS chip.

15. An audio application specific integrated circuit, comprising the negative charge pump of claim 1 and an audio amplifier where the supply voltage of the amplifier is the sum of the absolute values of the supply voltage of the negative charge pump and the voltage provided by the negative charge pump.

16. A negative charge pump, comprising
a supply terminal, a ground terminal, an output terminal, and a first clock terminal;
a first inverter, a second inverter, and a first charge storage;
where
the first inverter is connected between the supply terminal, the first clock terminal, and the first charge storage;
the second inverter is connected between the first charge storage, the ground terminal, and the output terminal; and coupled to the first clock terminal;
the first charge storage is connected between the first inverter and the second inverter;
during operation and with respect to the electric potential of the ground terminal the electric potential of the supply terminal is positive while the electric potential of the output terminal is negative,
further comprising a regulation circuit connected between the supply terminal, the first inverter, the ground terminal, and the output terminal,
where
the regulation circuit has a voltage divider, an error amplifier, and a transistor;
the voltage divider is connected between the supply terminal and the output terminal;
the transistor is connected between the first inverter and the ground terminal;
the error amplifier is connected between the supply terminal, the voltage divider, the ground terminal, and the transistor;
the transistor is connected between the first inverter, the error amplifier, and the ground terminal.

* * * * *